United States Patent
Kleman

(10) Patent No.: US 6,414,625 B1
(45) Date of Patent: Jul. 2, 2002

(54) METHOD AND DEVICE FOR LIQUID LEVEL MEASUREMENT BY MEANS OF RADAR RADIATION

(75) Inventor: Mikael Kleman, Vreta Kloster (SE)

(73) Assignee: Saab Marine Electronics AB, Göteborg (SE)

( * ) Notice: Subject to any disclaimer, the term of this patent is extended or adjusted under 35 U.S.C. 154(b) by 0 days.

(21) Appl. No.: 09/576,544

(22) Filed: May 22, 2000

(30) Foreign Application Priority Data

Jul. 2, 1999 (SE) .............................. 9902594

(51) Int. Cl.⁷ .............................. G01S 13/88
(52) U.S. Cl. ........................................ 342/124
(58) Field of Search ................. 342/124, 59; 73/290 R; 340/618

(56) References Cited

U.S. PATENT DOCUMENTS

| | | | |
|---|---|---|---|
| 4,319,242 A | * 3/1982 | Lewis | 342/59 |
| 4,665,403 A | 5/1987 | Edvardsson | 342/124 |
| 5,305,237 A | 4/1994 | Dalrymple et al. | 342/124 |
| 5,406,842 A | 4/1995 | Locke | 342/124 |
| 5,504,490 A | 4/1996 | Brendle et al. | 342/124 |

FOREIGN PATENT DOCUMENTS

WO   WO 90/09599   8/1990

* cited by examiner

Primary Examiner—Daniel T. Pihulic
(74) Attorney, Agent, or Firm—Swidler Berlin Shereff Friedman, LLP

(57) ABSTRACT

The invention relates to a method and a device for measuring a level in a receptacle using radar. Via an aerial (1) directed down into the receptacle, an electromagnetic wave is transmitted and a reflected and time-delayed wave is received, the level being calculated from the time delay. Via one and the same aerial (1) at least two waves are transmitted and received, which are mutually distinguishable by a detectable characteristic for each wave. The device according to the invention is characterized in that connected to the aerial (1) is at least one further radar measuring channel (3; 4), the radar waves of which are mutually distinguishable and distinguishable from the radar wave used in a first radar measuring channel.

10 Claims, 1 Drawing Sheet

METHOD AND DEVICE FOR LIQUID LEVEL MEASUREMENT BY MEANS OF RADAR RADIATION

The present invention relates to a method according to the preamble of claim 1.

The invention also relates to a device according to the preamble of claim 6.

A level measuring system working with radar for a tanker's load tanks is previously known from U.S. Pat. No. 4,665,403. In load tanks of this kind, however, at least one overfill alarm independent of the level measuring system is required. The requirement for independence means that there must not be common electrical circuits and cabling, i.e. there must not be any galvanic contact between different measuring systems. However, fixed mechanical constructions for example, which cannot normally go wrong, may be shared. Float sensors and different types of capacitive sensors, for example, mounted in separate tank bushings are used as sensors for such alarm systems. These sensors are however sensitive to linings, corrosion and other influence from the content of the load tanks or their wiring and the risk of malfunction is therefore evident.

The object of the present invention is to achieve a method of the type indicated by way of introduction which is not marred by the disadvantages described above. This object is achieved by the features stated in claim 1.

The invention also has the object of producing a device according to claim 6 which is improved compared with the prior art. This is achieved with the characterizing features stated in said claim.

A number of other advantages are obtained with the invention. By utilizing a single aerial for two or more level measuring channels, costs are saved for further aerials and fitting in the tank as well as the tank bushing for these. If two measuring channels are identical, redundant measuring results are obtained, which if they only lie within a certain tolerance range are proof that the measuring channels are functioning. Several identical measuring channels also make the stocking of spare parts easier and cheaper.

BRIEF DESCRIPTION OF THE DRAWINGS

The invention is to be explained further below with reference to the enclosed drawing, in which.

Figure 1:
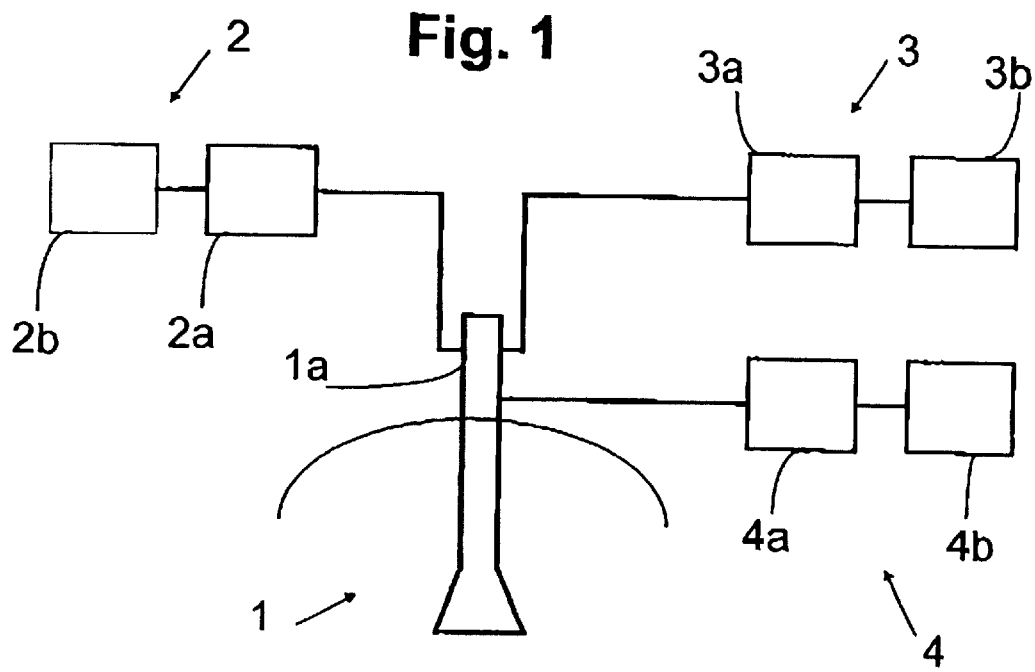
FIGS. 1 and 2 show diagrammatically two alternative ways of realizing the invention for level measurement—alarm indication for a tanker's load tanks, but it is evident that the invention can be used for all types of liquids and bulk material.

In the drawing, 1 generally designates an aerial. This can be a fixed or movable parabolic aerial, a conical aerial, a transmission line or a straight tube aerial. Connected to the aerial 1 is a radar measuring channel 2 comprising a transmitter/receiver 2a and an indicating device 2b designed to indicate the current level and generate an alarm at a predetermined level. According to the invention at least one further radar measuring channel is connected to the aerial 1, in the embodiment shown in the drawing there are two further radar measuring channels 3 and 4 respectively, each comprising a transmitter/receiver 3a and 4a respectively and an indicating device 3b and 4b respectively. To prevent radar waves transmitted by a transmitter e.g. in measuring channel 2 from being received reflected by the receivers in measuring channels 3 or 4, the radar waves from each channel are distinguishable by a detectable characteristic for each wave, e.g. by means of updating time-wise, polarization and/or modulation.

It will be appreciated that several different measuring and alarm alternatives can be provided using one or more additional measuring channels. For example, a measurement can be carried out using one extra radar measuring channel 3, which measurement is redundant to a level measurement carried out using measuring channel 2. If the measuring values from both measuring channels lie within predetermined tolerance values, it can hereby be verified with a very high degree of probability that the level value measured is correct. Alternatively, a high level alarm can be obtained with the extra measuring channel 3 in the form of an alarm at a maximum permitted level or an overfill alarm.

With two further measuring channels 3, 4 it is possible at the same time to execute both a redundancy measurement and produce a high level alarm. Alternatively, a level measurement can be executed using measuring channel 2, a high level alarm obtained with measuring channel 3 and an overfill alarm with measuring channel 4.

Figure 2:
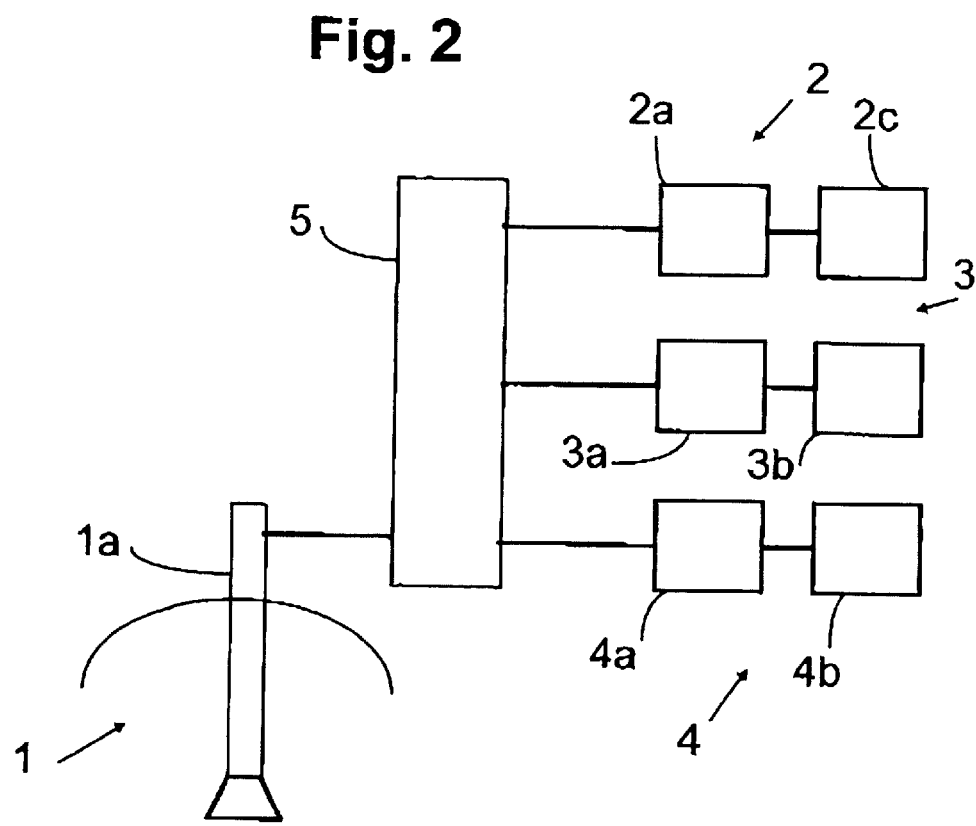

The devices according to FIGS. 1 and 2 differ essentially only with regard to how the measuring channels 2, 3 and 4 are connected to the aerial 1. In FIG. 1, the measuring channels are connected to a supply lead 1a to the aerial. In the alternative shown in FIG. 2, the measuring channels 2, 3 and 4 are connected to the supply lead 1a a via a power divider 5 known to the expert.

What is claimed is:

1. A method for measuring a level of a material in a receptacle, the method comprising:

producing electromagnetic waves with a plurality of measuring channels, the electromagnetic waves being distinguishable by a detectable characteristic for each channel;

transmitting the electromagnetic waves toward the material in the receptacle with a single antenna;

receiving a reflected time-delayed wave; and calculating the level based upon the time delay.

2. The method according to claim 1, wherein the electromagnetic waves are distinguishable time-wise.

3. The method according to claim 1, wherein the electromagnetic waves are distinguishable by at least one of modulation and polarization.

4. The method according to claim 1, further comprising:

measuring the level with redundant electromagnetic waves.

5. The method according to claim 1, further comprising:

producing a high level alarm if a level of the material exceeds a target level.

6. A device for measuring a level of a material in a receptacle, the device comprising:

a first measuring channel and at least one further measuring channel, each measuring channel comprising a transmitter, a receiver and an indicator and being operable to produce electromagnetic waves distinguishable by a detectable characteristic for each channel; and a single antenna connected to the first measuring channel and the second measuring channel and operable to transmit the electromagnetic waves toward the material and a time-delayed wave reflected by the material.

7. The device according to claim 6, wherein the at least one further measuring channel is redundant for another of the measuring channels.

8. The device according to claim 6, further comprising:
a second further measuring channel operable to measure and indicate a maximum permitted level.

9. The device according to claim 6, wherein the at least one further measuring channel is redundant for the first measuring channel, the device further comprising:
a second further measuring channel operable to measure a maximum permitted level.

10. The device according to claim 6, wherein the at least one further measuring channel is operable to measure the level, the device further comprising:
a second further measuring channel operable to measure a maximum permitted level.

* * * * *